United States Patent
Morishima et al.

(10) Patent No.: US 11,526,635 B2
(45) Date of Patent: Dec. 13, 2022

(54) METHOD, DESIGN DEVICE, AND DESIGN PROGRAM FOR CROSS-SECTIONAL SHAPE OF FUSELAGE

(71) Applicant: MITSUBISHI HEAVY INDUSTRIES, LTD., Tokyo (JP)

(72) Inventors: Shunichi Morishima, Tokyo (JP); Masatake Hatano, Tokyo (JP); Kiyoshi Sugeta, Tokyo (JP); Toshio Kozasa, Tokyo (JP); Timothy Craig Momose, Tokyo (JP); Takayuki Tani, Aichi (JP); Hitoshi Ojika, Aichi (JP); Masahiko Matsuhashi, Aichi (JP); Toshihiko Azuma, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1072 days.

(21) Appl. No.: 16/099,468

(22) PCT Filed: Apr. 20, 2017

(86) PCT No.: PCT/JP2017/015933
§ 371 (c)(1),
(2) Date: Nov. 7, 2018

(87) PCT Pub. No.: WO2017/203910
PCT Pub. Date: Nov. 30, 2017

(65) Prior Publication Data
US 2019/0087530 A1 Mar. 21, 2019

(30) Foreign Application Priority Data
May 26, 2016 (JP) .............................. JP2016-105405

(51) Int. Cl.
*G06F 30/15* (2020.01)
*B64C 1/06* (2006.01)
(Continued)

(52) U.S. Cl.
CPC ................ *G06F 30/15* (2020.01); *B64C 1/06* (2013.01); *B64C 1/068* (2013.01); *B64F 5/00* (2013.01); *G06F 2113/28* (2020.01)

(58) Field of Classification Search
CPC .. B64C 1/068; B64C 3/26; B64C 1/06; G06F 2113/28; G06F 30/15; F17C 1/00; B64F 5/00; G01N 3/12
See application file for complete search history.

(56) References Cited

U.S. PATENT DOCUMENTS 7,735,779 B2 * 6/2010 Griess ..................... B64C 1/068
244/119
8,292,226 B2 * 10/2012 Sankrithi ................ B64C 1/068
244/119
(Continued)

FOREIGN PATENT DOCUMENTS

EP      2774839 A2     9/2014

OTHER PUBLICATIONS

M. Kalaanchiam, B. Mannai, "Topology Optimization of Aircraft Fuselage Structure" pp. 820-823, 2013 (Year: 2013).*
(Continued)

*Primary Examiner* — Kibrom K Gebresilassie
(74) *Attorney, Agent, or Firm* — Hauptman Ham, LLP

(57) ABSTRACT

A method for designing the cross-sectional shape of the fuselage of a flying body having the fuselage extending in the roll axial direction, the section being taken on a plane perpendicular to the roll axial direction. This method is provided with: an initial setting step S12 for setting an initial cross-sectional shape, which is the initial cross-sectional shape of the fuselage having a cross-sectional shape that is not truly circular; load application steps S14, S21, S28 for analytically or experimentally preloading the fuselage having the initial cross-sectional shape; and a design shape setting step S17 for acquiring the cross-sectional shape of (Continued)

the preloaded fuselage as the design cross-sectional shape of the fuselage.

4 Claims, 7 Drawing Sheets

(51) Int. Cl.
    *B64F 5/00*     (2017.01)
    *G06F 113/28*     (2020.01)

(56) References Cited

U.S. PATENT DOCUMENTS

| | | | |
|---|---|---|---|
| 9,193,483 | B2 | 11/2015 | Kismarton |
| 9,868,135 | B2* | 1/2018 | Williams ............... B29C 48/154 |
| 2007/0108347 | A1* | 5/2007 | Sankrithi ................ B64C 1/061 |
| | | | 244/119 |
| 2009/0294588 | A1 | 12/2009 | Griess et al. |
| 2010/0200697 | A1* | 8/2010 | Sankrithi ................ B64C 1/068 |
| | | | 244/119 |
| 2010/0318327 | A1 | 12/2010 | Holden et al. |
| 2013/0099057 | A1 | 4/2013 | Martino Gonzalez et al. |
| 2014/0224928 | A1* | 8/2014 | Bernier .................. B21D 53/92 |
| | | | 244/108 |
| 2014/0288895 | A1 | 9/2014 | Fricero et al. |
| 2017/0158306 | A1* | 6/2017 | Kooiman .................. B64C 1/26 |

OTHER PUBLICATIONS

Supplementary European Search Report for European Application No. 17802508.6 dated Mar. 6, 2019; 12pp.

Kalanchiam et al.: "Topology Optimization of Aircraft Fuselage Structure" World Academy of Science, Engineering and Technology International Journal of Aerospace and Mechanical engineering, vol. 7, No. 5, Jan. 1, 2013; pp. 820-823; 4pp.

International Search report and Written Opinion for International Application No. PCT/JP2017/015933 dated Jul. 25, 2017; 17pp.

M. Kalanchiam et al., 'Topology Optimization of Aircraft Fuselage Structure', World Academy of Science, Engineering and Technology International Journal of Mechanical, Aerospace, Industrial, Mechatronic and Manufacturing Engineering vol. 7, No. 5, 2013, pp. 820-823; 4 pp.

K. Yusuf et al., 'Conceptual Design of Fuselage Structure of Very Light Jet Aircraft', Latest Trends on Theoretical and Applied Mechanics, Fluid Mechanics and Heat & Mass Transfer, 2010, pp. 100-106; 7pp.

A. Boulle et al., 'Parametric study of an elliptical fuselage made of a sandwich composite structure', Mechanics Research Communications 69, 2015, pp. 129-135; 7 pp.

* cited by examiner

METHOD, DESIGN DEVICE, AND DESIGN PROGRAM FOR CROSS-SECTIONAL SHAPE OF FUSELAGE

RELATED APPLICATIONS

The present application is a National Phase of International Application Number PCT/JP2017/015933 filed Apr. 20, 2017 and claims priority to Japanese Application Number 2016-105405 filed May 26, 2016.

TECHNICAL FIELD

The present invention relates to a design method, a design device, and a design program for designing a cross-sectional shape of a fuselage of a flying body such as an aircraft.

BACKGROUND ART

In the related art, an aircraft having a cross-section of an approximately elliptical shape in which a width direction of a fuselage is a long axis direction and a height direction (vertical direction) of the fuselage is a short axis direction is known as a fuselage of the aircraft (for example, see PTL 1).

CITATION LIST

Patent Literature

[PTL 1] U.S. Pat. No. 8,292,226

SUMMARY OF INVENTION

Technical Problem

In a case where a cross-sectional shape of a fuselage of a flying body such as an aircraft is a non-circular shape such as an elliptical shape as shown in PTL 1, in a case where a pressurized load is applied from an inside of the fuselage to an outside thereof due to a pressure difference between the inside and the outside of the fuselage in the sky, a larger bending moment is generated in the fuselage, compared with a fuselage having a circular cross-section. In a case where reinforcement against the bending moment is performed, a weight of the fuselage increases due to the reinforcement. Accordingly, in order to reduce a structural weight of the fuselage, it is necessary to design the fuselage having the non-circular cross-section such that a generated bending moment is small.

Accordingly, an object of the invention is to provide a design method, a design device, and a design program capable of designing a fuselage in which a generated bending moment is suppressed, even in a fuselage having a non-circular cross-sectional shape.

Solution to Problem

According to an aspect of the invention, there is provided a method for designing a cross-sectional shape of a fuselage taken on a plane perpendicular to a length direction of a flying body having the fuselage that extends in the length direction, in which the cross-sectional shape of the fuselage is a non-circular shape, the method including: an initial setting step of setting an initial cross-sectional shape that is a shape of an initial cross-section of the fuselage; a load application step of applying a pressurized load to the fuselage having the initial cross-sectional shape; and a design shape setting step of acquiring a cross-sectional shape of the fuselage after the pressurized load is applied as a design cross-sectional shape of the fuselage.

Further, according to another aspect of the invention, there is provided a design device that designs a cross-sectional shape of a fuselage taken on a plane perpendicular to a length direction of a flying body having the fuselage that extends in the length direction, in which the cross-sectional shape of the fuselage is a non-circular shape, the design device executing: an initial setting step of setting an initial cross-sectional shape that is a shape of an initial cross-section of the fuselage; and a design shape setting step of acquiring a cross-sectional shape of the fuselage after a pressurized load is applied to the fuselage having the initial cross-sectional shape as a design cross-sectional shape of the fuselage.

In addition, according to still another aspect of the invention, there is provided a design program executed by a design device for designing a cross-sectional shape of a fuselage taken on a plane perpendicular to a length direction of a flying body having the fuselage that extends in the length direction, in which the cross-sectional shape of the fuselage is a non-circular shape, the design program causing the design device to execute: an initial setting step of setting an initial cross-sectional shape that is a shape of an initial cross-section of the fuselage; and a design shape setting step of acquiring a cross-sectional shape of the fuselage after a pressurized load is applied to the fuselage having the initial cross-sectional shape as a design cross-sectional shape of the fuselage.

According to these configurations, by employing a cross-sectional shape after a pressurized load is applied as a design cross-sectional shape, it is possible to design a fuselage having a non-circular cross-sectional shape in which a generated bending moment is suppressed. That is, even in a case where a large bending moment is generated when a pressurized load is applied to a fuselage having an initial cross-sectional shape, by employing a cross-sectional shape of the fuselage when the pressurized load is applied as a design cross-sectional shape, the fuselage having the design cross-sectional shape has a shape in which a large bending moment is not easily generated with respect to the pressurized load. In a case where a pressurized load is applied, since the fuselage having a non-circular cross-sectional shape easily becomes a shape close to a circle, the design cross-sectional shape may easily become a shape close to a circle compared with the initial cross-sectional shape.

Further, it is preferable that the method further includes a confirmation step of determining whether a bending moment generated in the fuselage obtained in the load application step is equal to or smaller than a predetermined regulated bending moment, in which in a case where it is determined in the confirmation step that the bending moment is equal to or smaller than the regulated bending moment, the cross-sectional shape of the fuselage before the pressurized load is applied is acquired as the design cross-sectional shape of the fuselage, in the design shape setting step, and in a case where it is determined in the confirmation step that the bending moment is larger than the regulated bending moment, the cross-sectional shape of the fuselage after the pressurized load is applied is re-set as the initial cross-sectional shape.

According to this configuration, it is possible to confirm that a bending moment generated in a design cross-sectional shape is smaller than a regulated bending moment, and it is possible to design a fuselage having a design cross-sectional shape in which the generated bending moment is suppressed.

Further, it is preferable that the method further includes: a limiting condition setting step of setting a spatial limiting condition inside the fuselage; and a limiting condition determination step of determining whether the design cross-sectional shape of the fuselage satisfies the limiting condition.

According to this configuration, it is possible to determine whether a design cross-sectional shape satisfies a spatial limiting condition, and thus, it is possible to design a fuselage having a design cross-sectional shape that satisfies such a limiting condition.

In addition, it is preferable that the method further includes: a rigidity adjustment step of adjusting, in a case where it is determined in the limiting condition determination step that the design cross-sectional shape of the fuselage does not satisfy the limiting condition, a rigidity distribution in the design cross-sectional shape of the fuselage so that the design cross-sectional shape of the fuselage satisfies the limiting condition.

According to this configuration, by adjusting the rigidity distribution of the fuselage having the design cross-sectional shape, it is possible to change a design cross-sectional shape into a design cross-sectional shape that satisfies a limiting condition. In a case where rigidity of a part of the fuselage having a design cross-sectional shape is adjusted to become high, by increasing a plate thickness of a part of a skin or a frame that forms the fuselage in a manufacturing stage of the fuselage, it is possible to realize a designed fuselage.

DESCRIPTION OF EMBODIMENTS

Hereinafter, an embodiment according to the invention will be described in detail with reference to the accompanying drawings. The embodiments do not limit the invention. Further, components in the embodiment described below include easily replaceable components from the viewpoint of those skilled in the art, or include substantially the same components. Further, the components described below may be appropriately combined. Further, in a case where there are plural embodiments, the respective embodiments may be combined.

Embodiment

Figure 1:
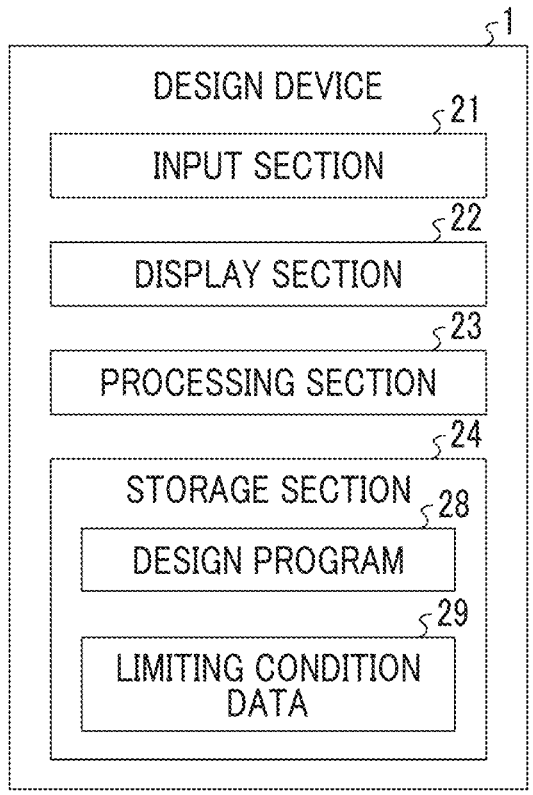
FIG. 1 is a configuration diagram showing control blocks of a design device according to an embodiment of the invention.
Figure 2:
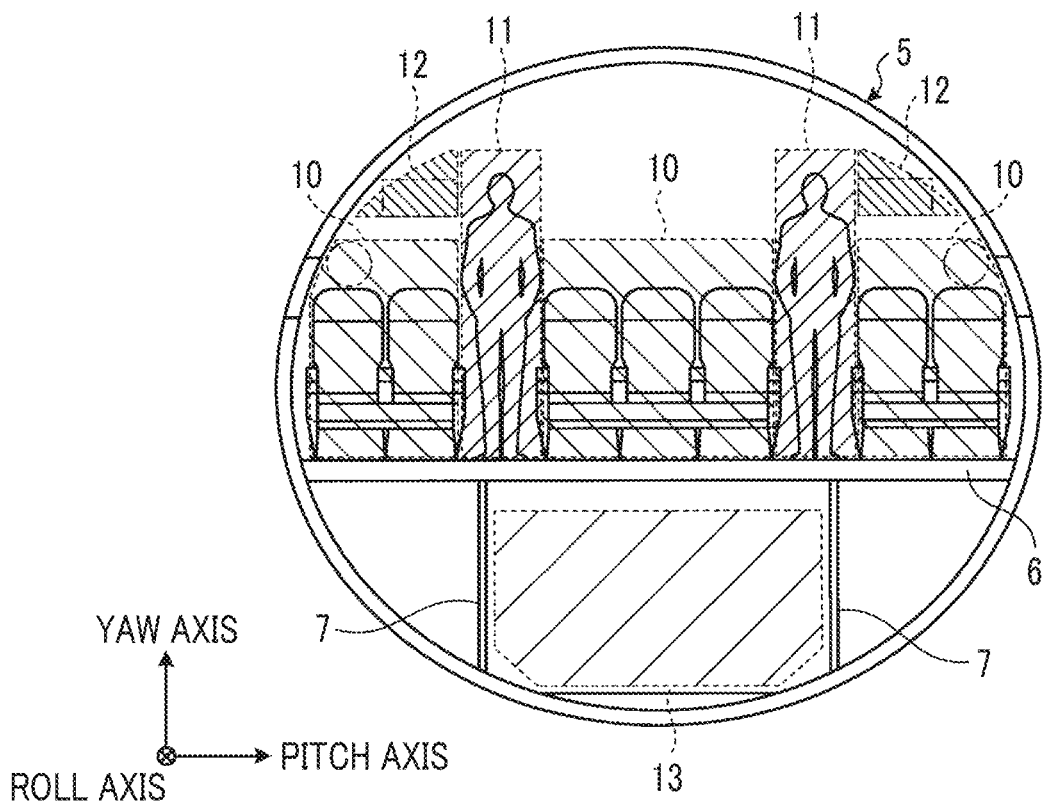
FIG. 2 is a sectional view of a fuselage taken on a plane perpendicular to a roll axis direction.
Figure 3:
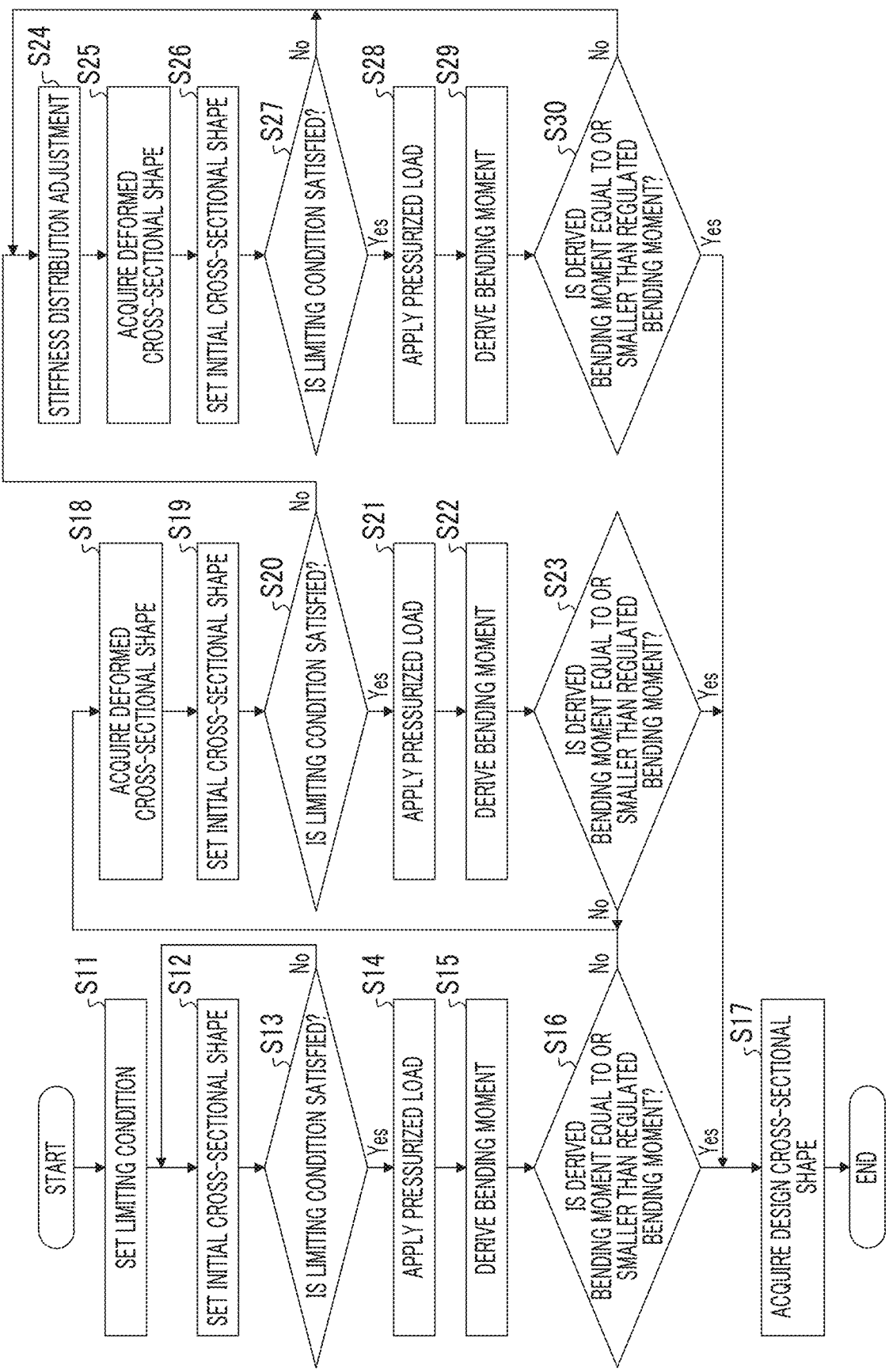
FIG. 3 is a diagram for illustrating an example of a control operation of the design device according to the embodiment of the invention.

FIG. 1 is a configuration diagram showing control blocks of a design device according to an embodiment of the invention. FIG. 2 is a sectional view of a fuselage taken on a plane perpendicular to a roll axis direction. FIG. 3 is a diagram for illustrating an example of a control operation of the design device according to the embodiment of the invention. FIGS. 4 to 9 are diagrams for illustrating examples relating to cross-sectional shapes of fuselages.

A design device 1 according to the embodiment is a device used for designing a fuselage of a flying body such as an aircraft, and designs a cross-sectional shape of the fuselage, for example. First, a fuselage 5 that is a design target will be described with reference to FIG. 2.

The fuselage 5 is formed to extend in a roll axis direction that is a length direction. FIG. 2 shows a section taken on a plane perpendicular to the roll axis direction of the fuselage 5. Accordingly, in FIG. 2, the roll axis direction is a front-back direction (a direction vertical to a paper plane in FIG. 2), a pitch axis direction perpendicular to the roll axis direction is a horizontal direction in FIG. 2, and a yaw axis direction perpendicular to the roll axis direction and the pitch axis direction is a vertical direction in FIG. 2.

As shown in FIG. 2, the fuselage 5 is formed to have a non-circular cross-section, and specifically, is formed in an approximately elliptical shape in which the pitch axis direction is a long axis direction and the yaw axis direction is a short axis direction. That is, the fuselage 5 is formed in a non-circular shape that is a flat annular shape in the pitch axis direction. The fuselage 5 includes a fuselage frame and a skin (which are not shown).

Further, the fuselage 5 is provided therein with a floor beam 6, and rods 7 that connect the floor beam 6 and the fuselage 5. The floor beam 6 is provided to extend in parallel with the pitch axis direction (long axis direction), and opposite portions thereof are connected to an inner circumferential surface of the fuselage 5. The rods 7 are provided on both sides with the center of the floor beam 6 in the pitch axis direction being interposed therebetween, and respectively connect a lower surface of the floor beam 6 and the inner circumferential surface of the fuselage 5.

In addition, the fuselage 5 is formed to secure a predetermined space in an inner portion thereof. The predetermined space includes a seat space 10 in which seats are provided, a passage space 11 through which a person can pass, an overhead bin space 12 in which baggage is accommodated, a cargo compartment space 13 that accommodates cargos, and the like. Three seat spaces 10 are provided above the floor beam 6. The three seat spaces 10 are respectively provided on opposite sides and at the center in the pitch axis direction. Two passage spaces 11 are provided above the floor beam 6, and are respectively provided to be disposed between the three seat spaces 10. Two overhead bin spaces 12 are provided above the floor beam 6, and are provided above the seat spaces 10 on opposite sides in the pitch axis direction. The cargo compartment space 13 is provided below the floor beam 6, and is provided between the rods 7 on opposite sides in the pitch axis direction.

As an aircraft having the fuselage 5 configured as described above flies in the sky, an external pressure of the fuselage 5 is lowered compared with an internal pressure thereof, and a pressurized load is applied from the inside to the outside due to a pressure difference between the internal pressure and the external pressure. The fuselage 5 is designed by the design device 1 described below so that a bending moment generated due to the application of the pressurized load. Further, in the fuselage 5, a spatial limiting condition for securing the above-mentioned predetermined spaces is set in design.

Next, the design device 1 will be described with reference to FIG. 1. As shown in FIG. 1, the design device 1 is a device that is operable by a designer, and design of the fuselage 5 is performed on the design device 1. The design device 1 includes an input section 21, a display section 22, a processing section 23, and a storage section 24. The design device 1 is not particularly limited to a configuration in which a singular device is provided, and may employ a configuration in which plural devices cooperate with each other.

The input section 21 includes an input device such as a keyboard or a mouse, and outputs a signal corresponding to an operation to be performed with respect to the input device from a user to the processing section 23. The display section 22 includes a display device such as a display, and displays a screen including a variety of information such as letters or figures on the basis of a display signal output from the processing section 23.

The processing section 23 includes an integrated circuit such as a central processing unit (CPU) and a memory that is a work area, and executes various programs using such hardware resources to execute various steps. Specifically, the processing section 23 reads out a program stored in the storage section 24 to expand the result into the memory, and causes the CPU to execute a command included in the program expanded in the memory to execute various steps.

The storage section 24 includes a non-volatile storage device such as a magnetic storage device or a semiconductor storage device, and stores a variety of programs and data. The program stored in the storage section 24 includes a design program 28 for designing the fuselage 5. Further, the data stored in the storage section 24 includes limiting condition data 29 that is data relating to a limiting condition.

The design device 1 having such a configuration is able to design the fuselage 5 as the processing section 23 executes the design program 28.

Then, a control operation of the design device 1 will be described with reference to FIG. 3. In FIG. 3, a control operation relating to a design of a cross-sectional shape of the fuselage 5 using the design device 1 is shown.

As shown in FIG. 3, first, a designer operates the input section 21 of the design device 1 to input a limiting condition of the fuselage 5. As the limiting condition, spaces of the seat spaces 10, the passage spaces 11, the overhead bin spaces 12, the cargo compartment space 13, and the like are set. The processing section 23 of the design device 1 sets the input limiting condition in accordance with a signal input through the input section 21 based on the operation of the designer, generates limiting condition data 29 on the basis of the input limiting condition, and retains the result in the storage section 24 (step S11: limiting condition setting step).

Subsequently, the designer operates the input section 21 of the design device 1 to input an initial cross-sectional shape that is a shape of an initial cross-section of the fuselage 5. The processing section 23 of the design device 1 sets the initial cross-sectional shape of the input fuselage 5 in accordance with a signal input through the input section 21 based on the operation of the designer (step S12: initial setting step). The set initial cross-sectional shape of the fuselage 5 is generated and set as an analysis model that is a model for performing analysis.

Figure 4:
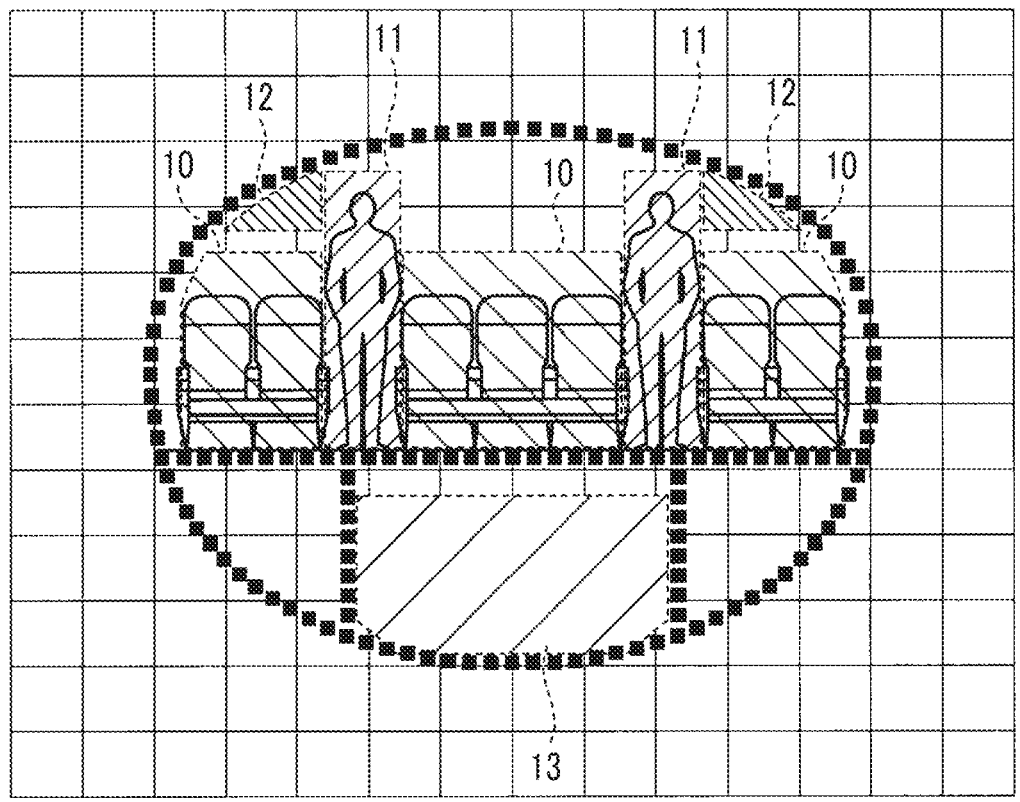
FIG. 4 is a diagram for illustrating an example relating to a cross-sectional shape of a fuselage.

FIG. 4 shows an initial cross-sectional shape that is an analysis model set by the initial setting step S12. Here, a limiting condition is set in the initial cross-sectional shape shown in FIG. 4.

After the initial cross-sectional shape is set, the design device 1 determines whether the initial cross-sectional shape satisfies the limiting condition (step S13: limiting condition determination step). That is, the design device 1 determines whether it is possible to secure the spaces of the seat spaces 10, the passage spaces 11, the overhead bin spaces 12, the cargo compartment space 13, and the like, inside the initial cross-sectional shape. In a case where it is determined that the initial cross-sectional shape does not satisfy the limiting condition (No in step S13), the procedure proceeds to step S12, and the design device 1 makes a request for re-setting of the initial cross-sectional shape.

On the other hand, in a case where it is determined that the initial cross-sectional shape satisfies the limiting condition (Yes in step S13), the design device 1 applies a pressurized load to the fuselage 5 having the initial cross-sectional shape (step S14: load application step). In the load application step S14, an analysis step is performed in a state where the pressurized load is applied to the initial cross-sectional shape that is the analysis model. Further, the design device 1 derives a bending moment generated in the fuselage 5 as an analysis processing result (step S15).

Figure 5:
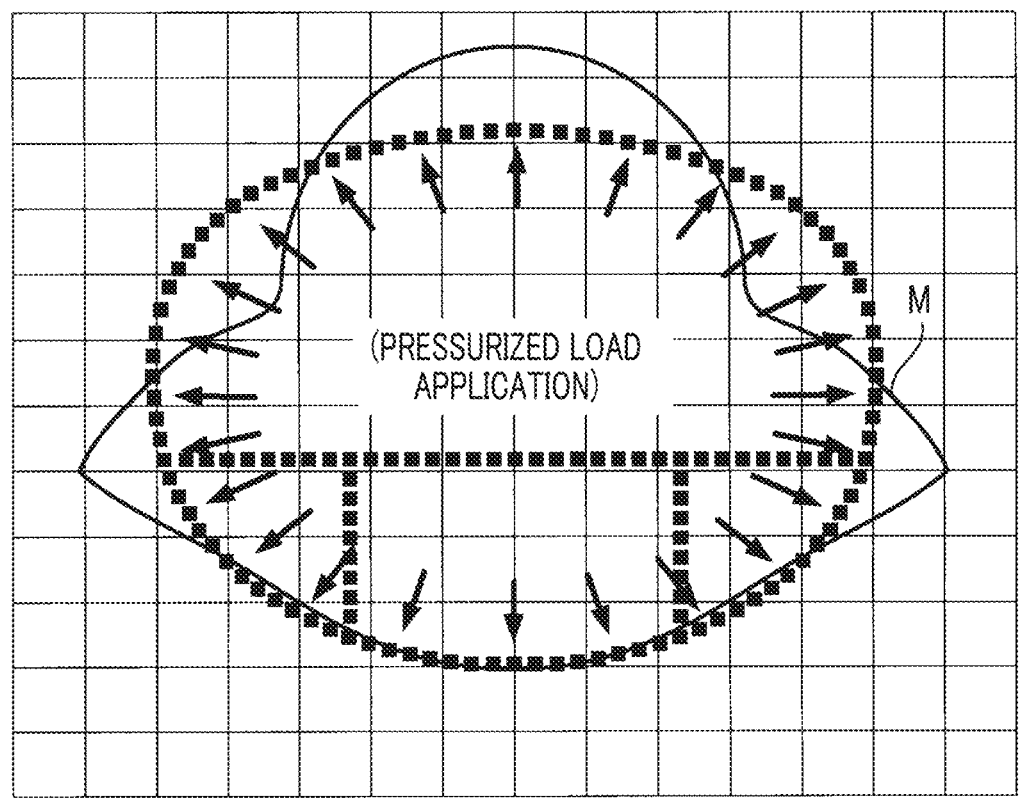
FIG. 5 is a diagram for illustrating an example relating to a cross-sectional shape of a fuselage.

FIG. 5 shows the fuselage 5 after the pressurized load is applied in step S14. In the fuselage 5 after the pressurized load is applied, a bending moment M is generated. The bending moment M shown in FIG. 5 shows a value at each position along an outer circumference of the fuselage 5, in which the outside of the fuselage represents a positive value and the inside of the fuselage represents a negative value, using the position on the outer circumference of the fuselage 5 as a reference (zero). Further, the magnitude of the value of the bending moment M is indicated by a distance from the position on the outer circumference of the fuselage 5, in which as the distance becomes larger, a larger bending moment is generated. The bending moment M has a distribution in which a positive value becomes large in an upper portion of the fuselage 5 in the yaw axis direction and in portions of the fuselage 5 on opposite sides of the floor beam 6. Further, the bending moment M has a distribution in which a negative value becomes large in portions between the upper portion of the fuselage 5 and the portions of the fuselage 5 on the opposite sides of the floor beam 6.

Subsequently, the design device 1 determines whether the derived bending moment is equal to or smaller than a predetermined regulated bending moment (step S16: confirmation step). Here, the regulated bending moment is set as an allowable value at which the bending moment generated along a circumferential direction of the fuselage 5 is allowable. The regulated bending moment may be set as a value at which the bending moment generated along the circumferential direction of the fuselage 5 becomes uniform. In a case where it is determined that the derived bending moment is equal to or smaller than the regulated bending moment (Yes in step S16), the design device 1 acquires the initial cross-sectional shape as a design cross-sectional shape (step S17: design shape setting step), and terminates the series of control operations.

On the other hand, in a case where it is determined whether the derived bending moment is larger than the regulated bending moment (No in step S16), the design device 1 acquires a cross-sectional shape of the fuselage after deformation obtained by application of a pressurized load (step S18). Further, the design device 1 re-sets the obtained cross-sectional shape of the fuselage 5 after deformation as an initial cross-sectional shape (step S19: initial setting step).

Figure 6:
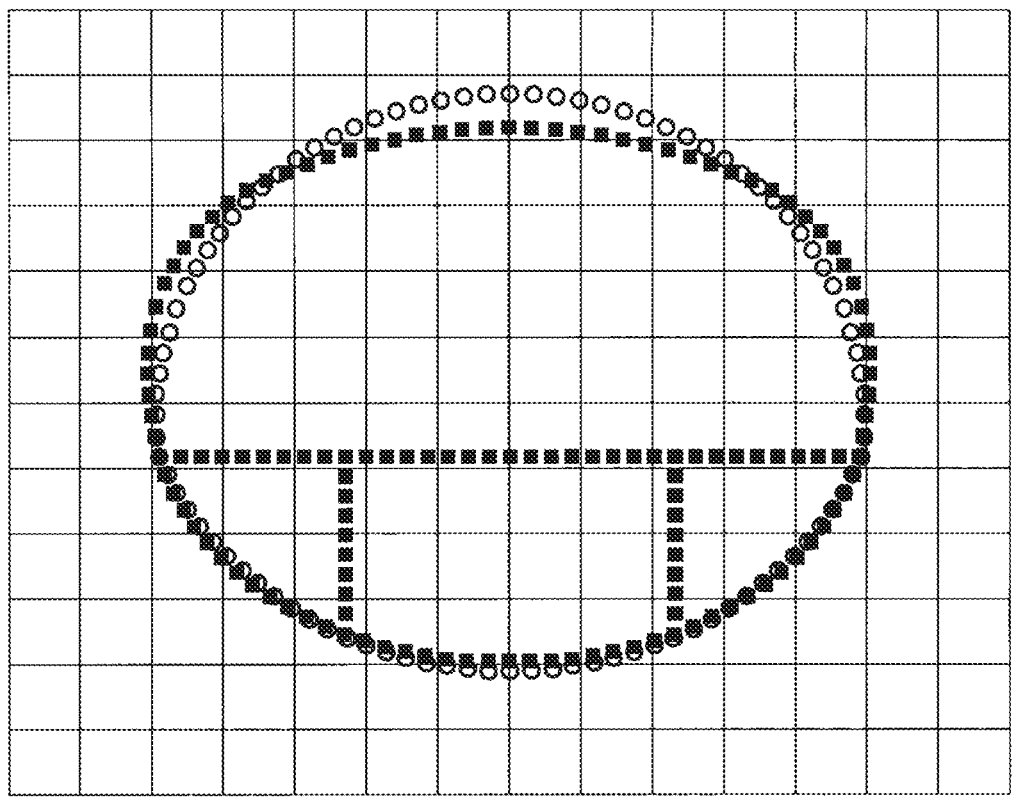
FIG. 6 is a diagram for illustrating an example relating to a cross-sectional shape of a fuselage.

FIG. 6 shows a cross-sectional shape (●) of the fuselage 5 before deformation and a cross-sectional shape (O) of the fuselage 5 after deformation. The cross-sectional shape (●) of the fuselage 5 before deformation corresponds to the initial cross-sectional shape set in step S12, and the cross sectional shape (O) of the fuselage 5 after deformation corresponds to the initial cross-sectional shape set in step S19. As shown in FIG. 6, in a case where a pressurized load is applied, the approximately elliptical fuselage 5 becomes a shape close to a circle. Accordingly, the design cross-sectional shape may easily become a shape close to a circle compared with the initial cross-sectional shape.

Figure 7:
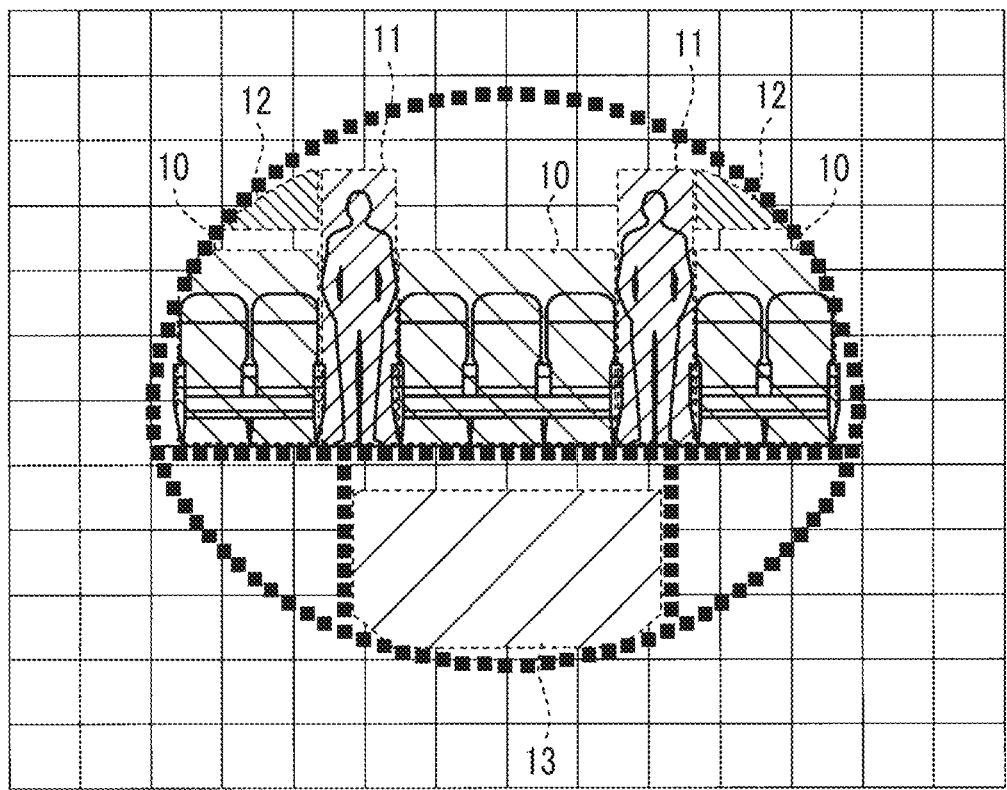
FIG. 7 is a diagram for illustrating an example relating to a cross-sectional shape of a fuselage.

In a case where the initial cross-sectional shape is set, the design device 1 determines whether the initial cross-sectional shape satisfies a limiting condition (step S20: limiting condition determination step). As shown in FIG. 7, in the initial cross-sectional shape that becomes the cross-sectional shape of the fuselage 5 after deformation, a limiting condition is set. Since step S20 is the same step as step S13, description thereof will not be repeated. In a case where it is determined that the initial cross-sectional shape satisfies the limiting condition (Yes in step S20), the design device 1 executes processes from step S21 to step S23. Since step S21 to step S23 are the same as step S14 to step S16, description thereof will not be repeated.

On the other hand, in a case where it is determined that the cross-sectional shape does not satisfy the limiting condition (No in step S20), the design device 1 adjusts a rigidity distribution of the initial cross-sectional shape (step S24: rigidity adjustment step). That is, the designer operates the input section 21 of the design device 1 to adjust the rigidity distribution of the initial cross-sectional shape of the fuselage 5 to satisfy the limiting condition. The processing section 23 of the design device 1 sets the rigidity distribution after adjustment with respect to the initial cross-sectional shape of the fuselage 5 in accordance with an input signal through the input section 21 based on the operation of the designer.

Further, the design device 1 applies a pressurized load to the cross-sectional shape after the rigidity distribution is adjusted, and acquires a cross-sectional shape after deformation due to the application of the pressurized load (step S25). Then, the design device 1 re-sets the cross-sectional shape of the fuselage 5 after the rigidity distribution is adjusted as an initial cross-sectional shape (step S26: initial setting step).

Figure 8:
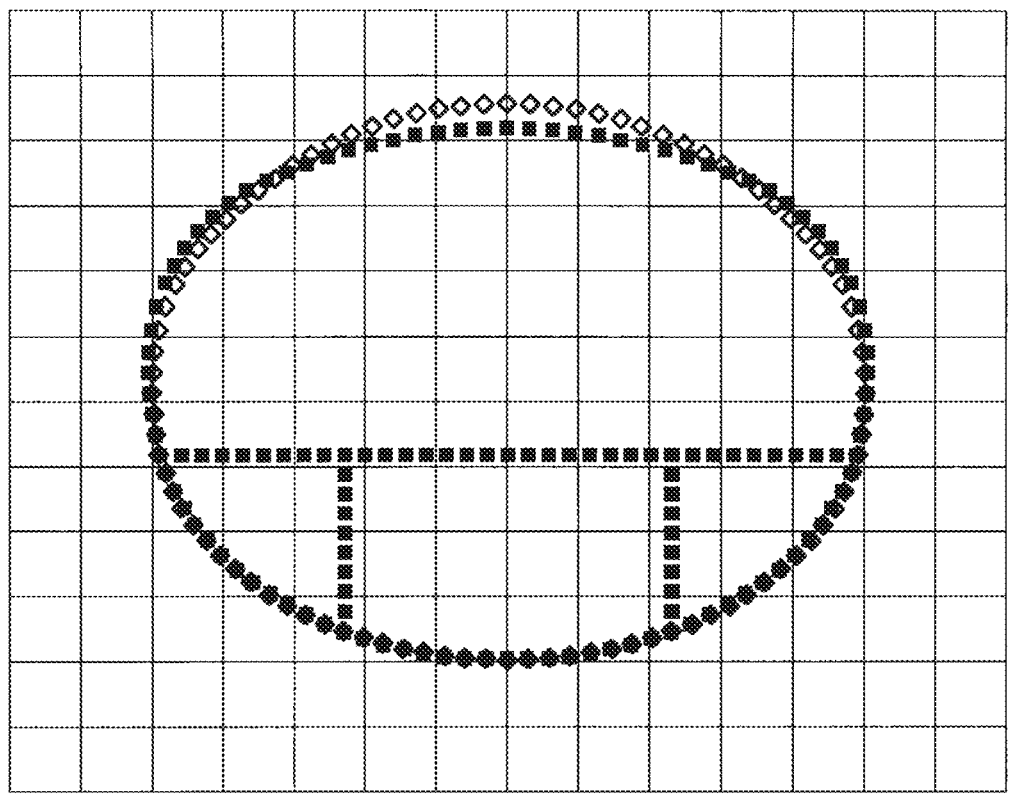
FIG. 8 is a diagram for illustrating an example relating to a cross-sectional shape of a fuselage.

FIG. 8 shows a cross-sectional shape (●) of the fuselage 5 before a rigidity distribution is adjusted and a cross-sectional shape (◇) of the deformed fuselage 5 after the rigidity distribution is adjusted. Further, the cross-sectional shape (◇) that is re-set in step S26 becomes the cross-sectional shape of the deformed fuselage 5 after the rigidity distribution is adjusted.

In a case where the initial cross-sectional shape is set, the design device 1 determines whether the initial cross-sectional shape satisfies the limiting condition (step S27: limiting condition determination step). Since step S27 is the same step as step S13 and step S20, description thereof will not be repeated. In a case where it is determined that the initial cross-sectional shape does not satisfy the limiting condition (No in step S27), the procedure proceeds to step S24, and the design device requests the designer to re-adjust the rigidity distribution. In a case where the request of the re-adjustment of the rigidity distribution is output from the design device 1, the designer operates the input section of the design device 1 to re-adjust the rigidity distribution in the initial cross-sectional shape of the fuselage 5 to satisfy the limiting condition.

On the other hand, in a case where it is determined that the initial cross-sectional shape satisfies the limiting condition (Yes in step S27), the design device 1 executes processes from step S28 to step S30. Since step S28 to step S30 are also the same as step S14 to step S16, and step S21 to step S23, description thereof will not be repeated. In step S30, in a case where it is determined the derived bending moment is larger than the regulated bending moment (No in step S30), the procedure proceeds to step S24, and the design device 1 requests re-adjustment of the rigidity distribution.

On the other hand, in step S30, in a case where it is determined that the derived bending moment is equal to or smaller than the regulated bending moment (Yes in step S30), the design device 1 obtains the initial cross-sectional shape as a design cross-sectional shape (step S17: design shape setting step), and terminates the series of control operations.

Figure 9:
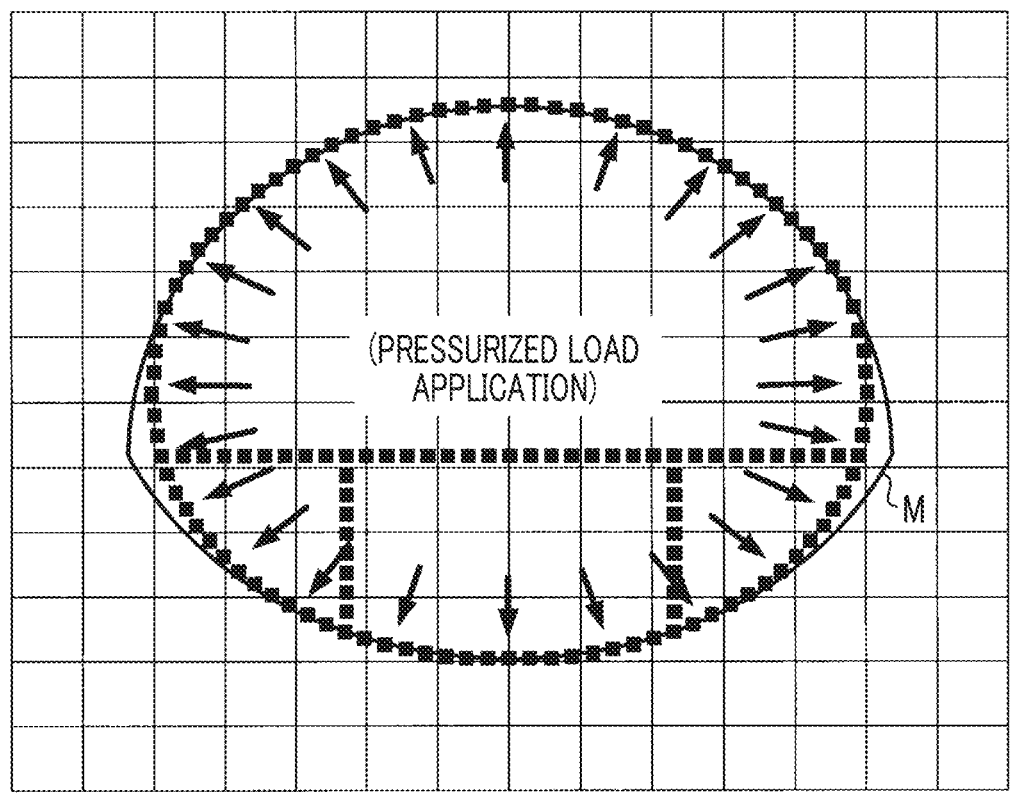
FIG. 9 is a diagram for illustrating an example relating to a cross-sectional shape of a fuselage.

FIG. 9 shows the fuselage 5 after the pressurized load is applied in step S28. In the fuselage 5 after the pressurized load is applied, a bending moment M is generated, but the bending moment is suppressed compared with the bending moment M shown in FIG. 5, generated in step S14. That is, the bending moment M shown in FIG. 9 has a distribution in which a positive value becomes small (the distance from the outer surface of the fuselage is short) in the upper portion of the fuselage 5 in the yaw axis direction and in the portions of the fuselage 5 on the opposite sides of the floor beam 6, compared with the bending moment M shown in FIG. 5. Further, the bending moment M has a distribution in which a negative value becomes small (the distance from the outer surface of the fuselage is short) in the portions between the upper portion of the fuselage 5 and the portions of the fuselage 5 on the opposite sides of the floor beam 6, compared with the bending moment M shown in FIG. 5. In this way, as shown in FIG. 9, the bending moment M generated by the adjustment of the rigidity distribution becomes a sufficiently small value, compared with the bending moment M shown in FIG. 5.

As described above, according to this embodiment, by employing a cross-sectional shape after a pressurized load is applied as a design cross-sectional shape, it is possible to design a fuselage 5 having a non-circular cross-sectional shape in which a generated bending moment M is suppressed. That is, even in a case where a large bending moment M is generated when a pressurized load is applied to the fuselage 5 having an initial cross-sectional shape, by employing the cross-sectional shape of the fuselage 5 when the pressurized load is applied as a design cross-sectional shape, the fuselage 5 having the design cross-sectional shape has a shape in which a large bending moment M is not easily generated with respect to the pressurized load.

Further, according to this embodiment, by performing the confirmation steps S16, S23, and S30, it is possible to confirm that a bending moment generated in a design cross-sectional shape is smaller than a regulated bending moment, and it is possible to design the fuselage 5 having a design cross-sectional shape in which a bending moment is suppressed.

In addition, according to this embodiment, as the approximately elliptical fuselage 5 in which the floor beam 6 is provided in parallel with the long axis direction, it is possible to design the fuselage 5 in which a bending moment is suppressed.

Further, according to this embodiment, by performing the limiting condition determination steps S13, S20, and S27, it is possible to determine whether a design cross-sectional shape satisfies a spatial limiting condition, and thus, it is possible to design the fuselage 5 having a design cross-sectional shape that satisfies such a limiting condition.

Furthermore, according to this embodiment, by performing the rigidity adjustment step S24, it is possible to change a design cross-sectional shape into a design cross-sectional shape that satisfies a limiting condition. In a case where rigidity of a part of the fuselage 5 having a design cross-sectional shape is adjusted to become high, by increasing a plate thickness of a part of a skin or a frame that forms the fuselage 5 in a manufacturing stage of the fuselage 5, it is possible to realize the designed fuselage 5.

In this embodiment, on the design device 1, the bending moment M is acquired by executing an analysis step of applying a pressurized load to an initial cross-sectional shape as an analysis model, but the bending moment M may be acquired by experimentally applying a pressurized load to the fuselage 5 as a test piece having an initial cross-sectional shape.

Further, in this embodiment, on the design device 1, the fuselage 5 is designed to have a design cross-sectional shape in which a bending moment is suppressed in a fuselage having an approximately elliptical cross-sectional shape in which a pitch axis direction is a long axis direction and a yaw axis direction is a short axis direction, but it is also possible to apply the same design with respect to all fuselages having non-circular shapes other than the approximately elliptical shape.

Figure 10:
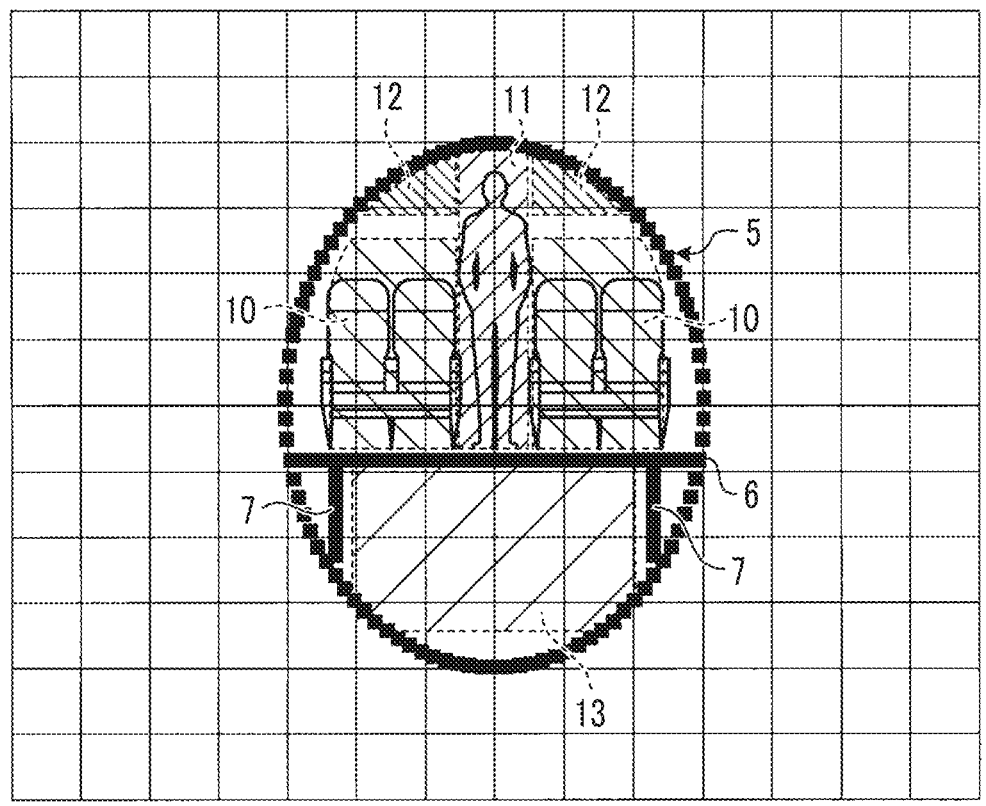
FIG. 10 is a diagram for illustrating an example relating to a cross-sectional shape of a fuselage.
Figure 11:
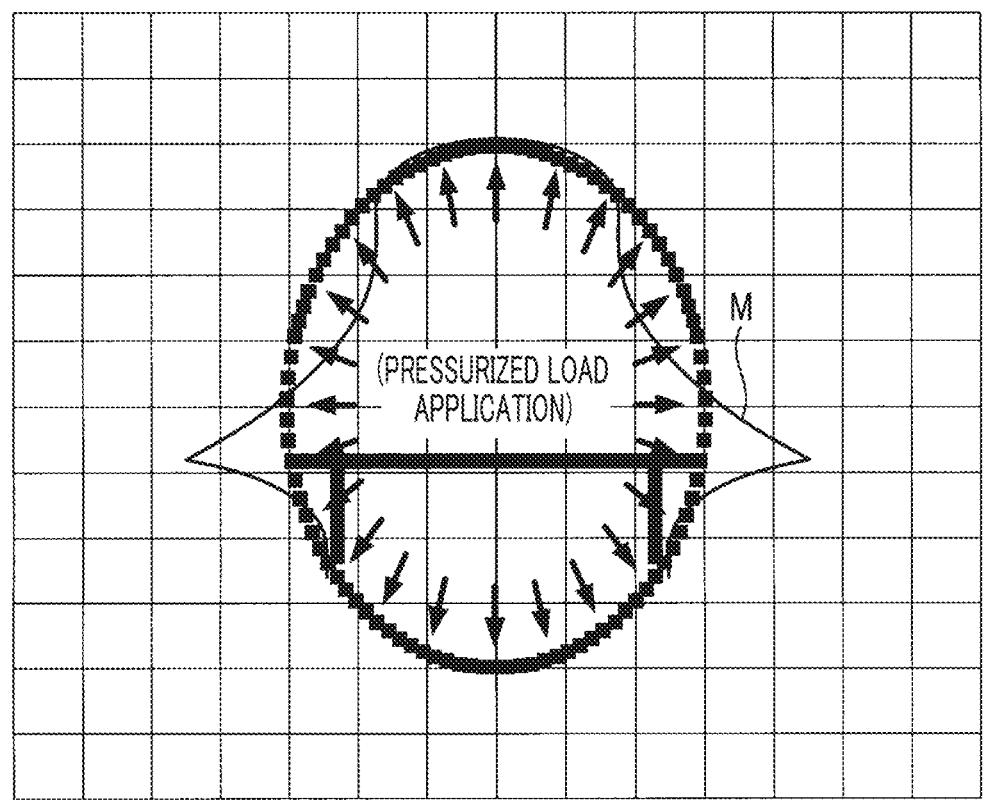
FIG. 11 is a diagram for illustrating an example relating to a cross-sectional shape of a fuselage.
Figure 12:
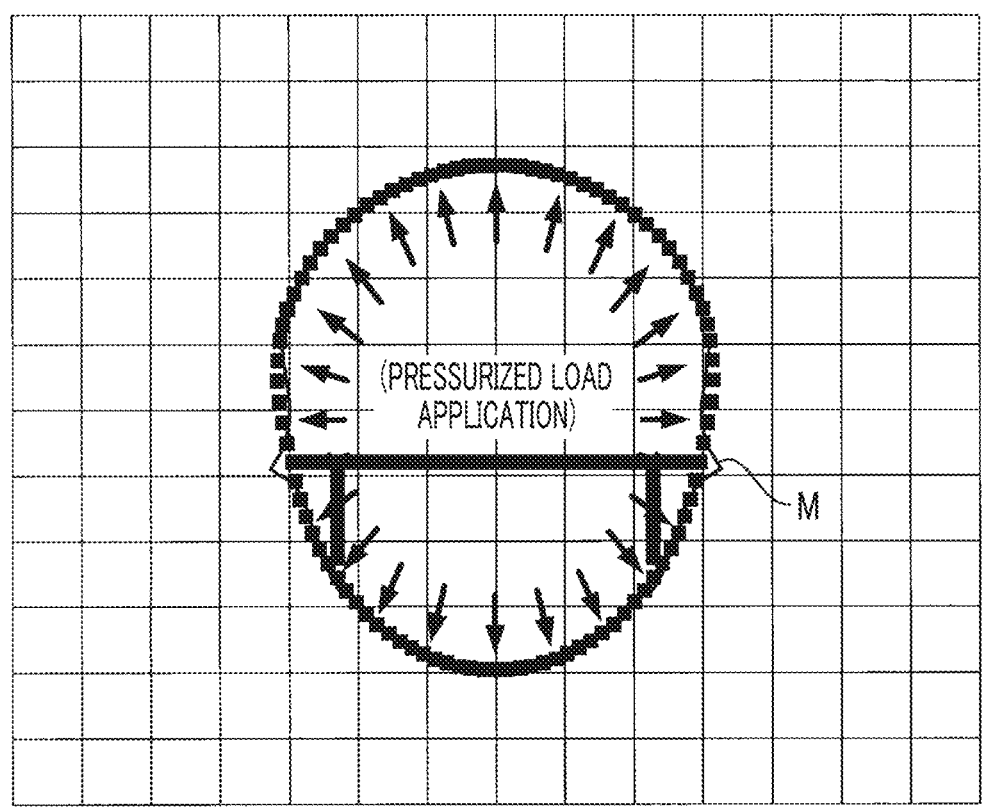
FIG. 12 is a diagram for illustrating an example relating to a cross-sectional shape of a fuselage.

Specifically, as the non-circular fuselage, for example, there is a fuselage shown in FIGS. 10 to 12. FIGS. 10 to 12 are diagrams of an example relating to a cross-sectional shape of a fuselage. The fuselage 5 shown in FIGS. 10 to 12 has an approximately elliptical cross-sectional shape in which the pitch axis direction is the short axis direction and the yaw axis direction is the long axis direction. In the fuselage 5 shown in FIGS. 10 to 12, similarly, it is possible to apply the same design using the cross-sectional shape design method of the fuselage shown in FIG. 3.

Here, in FIG. 10, an initial cross-sectional shape as an analysis model set by the initial setting step S12 is shown. Further, in the initial cross-sectional shape shown in FIG. 10, a limiting condition set in the limiting condition setting step S11 is shown.

With respect to the initial cross-sectional shape shown in FIG. 10, the fuselage 5 after the load application step S14 is performed becomes the fuselage 5 shown in FIG. 11. As shown in FIG. 11, in the fuselage 5 after the pressurized load is applied, a bending moment M is generated. The bending moment M becomes large in portions of the fuselage 5 on the opposite sides of the floor beam 6.

The cross-sectional shape of the fuselage 5 shown in FIG. 12 represents a design cross-sectional shape acquired in the design shape setting step S17. The design cross-sectional shape of the fuselage 5 shown in FIG. 12 is a cross-sectional shape obtained by appropriately executing the processes from step S18 to step S23 or the processes from step S24 to step S30. As shown in FIG. 12, the fuselage 5 having the design cross-sectional shape acquired in the design shape setting step S17, a bending moment M is generated, but the bending moment is suppressed compared with the bending moment M shown in FIG. 5, generated in step S14.

As described above, in the fuselage 5 having an approximately elliptical cross-section in which the pitch axis direction is the short axis direction and the yaw axis direction is the long axis direction, similarly, it is possible to design a fuselage 5 having a non-circular cross-section in which a generated bending moment M is suppressed.

REFERENCE SIGNS LIST

1 design device
5 fuselage
6 floor beam
7 rod
10 seat space
11 passage space
12 overhead bin space
13 cargo compartment space
21 input section
22 display section
23 processing section
24 storage section
28 design program
29 limiting condition data

The invention claimed is:

1. A method for designing a cross-sectional shape of a fuselage taken on a plane perpendicular to a length direction of a flying body having the fuselage that extends in the length direction, wherein the cross-sectional shape of the fuselage is a non-circular shape, the method comprising:

an initial setting step of setting an initial cross-sectional shape that is a shape of an initial cross-section of the fuselage;

a load application step of applying a pressurized load to the fuselage having the initial cross-sectional shape; and a design shape setting step of acquiring a load-applied cross-sectional shape of the fuselage after the pressurized load is applied as a design cross-sectional shape of the fuselage, wherein the method further comprises a confirmation step of determining whether a bending moment generated in the fuselage obtained in the load application step is equal to or smaller than a predetermined regulated bending moment, in response to determining in the confirmation step that the bending moment is equal to or smaller than the predetermined regulated bending moment, the initial cross-sectional shape of the fuselage before the pressurized load is applied is acquired as the design cross-sectional shape of the fuselage, in the design shape setting step, in response to determining in the confirmation step that the bending moment is larger than the predetermined regulated bending moment, the load-applied cross-sectional shape of the fuselage after the pressurized load is applied is re-set as a re-set initial cross-sectional shape, the initial setting step further includes setting a seat space, a passage space, an overhead bin space, and a cargo compartment space, and the load application step and the confirmation step are re-executed using the re-set initial cross-sectional shape.

2. The method according to claim 1, further comprising:
a limiting condition setting step of setting a spatial limiting condition inside the fuselage; and
a limiting condition determination step of determining whether the design cross-sectional shape of the fuselage satisfies the spatial limiting condition.

3. The method according to claim 2, further comprising:
a rigidity adjustment step of adjusting, in response to determining in the limiting condition determination step that the design cross-sectional shape of the fuselage does not satisfy the spatial limiting condition, a rigidity distribution in the design cross-sectional shape of the fuselage so that the design cross-sectional shape of the fuselage satisfies the spatial limiting condition.

4. A storage device that stores a design program that causes, when executed by a design device for designing a cross-sectional shape of a fuselage taken on a plane perpendicular to a length direction of a flying body having the fuselage that extends in the length direction, wherein the cross-sectional shape of the fuselage is a non-circular shape, the design device to execute:
an initial setting step of setting an initial cross-sectional shape that is a shape of an initial cross-section of the fuselage;
a load application step of applying a pressurized load to the fuselage having the initial cross-sectional shape; and
a design shape setting step of acquiring a load-applied cross-sectional shape of the fuselage after the pressurized load is applied to the fuselage having the initial cross-sectional shape as a design cross-sectional shape of the fuselage,
wherein
the design program, when executed by the design device, causes the design device to further execute a confirmation step of determining whether a bending moment generated in the fuselage obtained in the load application step is equal to or smaller than a predetermined regulated bending moment,
in response to determining in the confirmation step that the bending moment is equal to or smaller than the predetermined regulated bending moment, the initial cross-sectional shape of the fuselage before the pressurized load is applied is acquired as the design cross-sectional shape of the fuselage, in the design shape setting step,
in response to determining in the confirmation step that the bending moment is larger than the predetermined regulated bending moment, the load-applied cross-sectional shape is re-set as a re-set initial cross-sectional shape,
the initial setting step further includes setting a seat space, a passage space, an overhead bin space, and a cargo compartment space, and
the load application step and the confirmation step are re-executed using the re-set initial cross-sectional shape.

* * * * *